United States Patent [19]

Hilburger et al.

[11] Patent Number: 4,982,807

[45] Date of Patent: Jan. 8, 1991

[54] DRIVE-SLIP CONTROL DEVICE FOR MOTOR VEHICLES

[75] Inventors: Walter Hilburger, Nürtingen; Siegfried Ochs, Remshalden, both of Fed. Rep. of Germany

[73] Assignee: Mercedes-Benz AG, Fed. Rep. of Germany

[21] Appl. No.: 413,211

[22] Filed: Sep. 27, 1989

[30] Foreign Application Priority Data

Oct. 3, 1988 [DE] Fed. Rep. of Germany ....... 3833588

[51] Int. Cl.$^5$ .............................................. B60K 31/00
[52] U.S. Cl. .................................................... 180/197
[58] Field of Search ........................... 180/197, 76, 275

[56] References Cited

U.S. PATENT DOCUMENTS 4,856,610  8/1989  Leiber et al. ......................... 180/197

FOREIGN PATENT DOCUMENTS 31866   2/1988  Japan .................................... 180/197
106138  5/1988  Japan .................................... 180/197

*Primary Examiner*—Charles A. Marmor
*Assistant Examiner*—Alan M. Kagen
*Attorney, Agent, or Firm*—Evenson, Wands, Edwards, Lenahan & McKeown

[57] ABSTRACT

A Drive-slip control device for motor vehicles in which, when a driven vehicle wheel spins, this wheel is braked and wherein when both driven wheels spin, the engine power is additionally reduced. Spinning of the drive wheels is recognized by means of rotational-speed sensors and an electronic system and when a spin signal is present on account of a differential-speed threshold value between driven and non-driven vehicle axles being exceeded, the power of the engine is reduced in a controlled manner by the electronic system during the duration of the spin signal by means of a final control element. When the spin signal stops, the power of the engine is increased again in a controlled manner to the target value predetermined by the driver by means of the accelerator. However, when power is reduced by the driver during a control operation of the drive-slip control device, below the engine control target value predetermined by the electronic system of the drive-slip control device (during a gear shift) and when power is increased again (when the gear-shift operation is complete) provided this takes place within a predetermined time, only the value which was also present before the reduction of power is permitted again as maximum power.

2 Claims, 2 Drawing Sheets

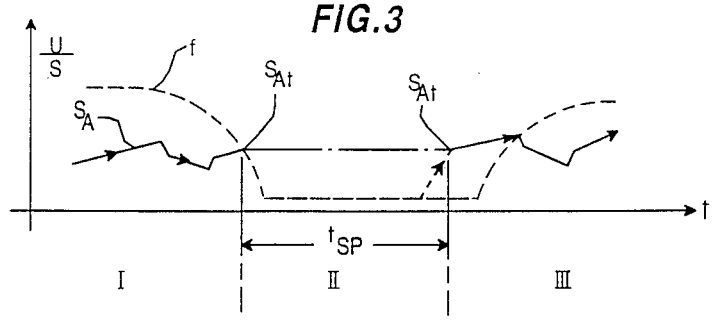
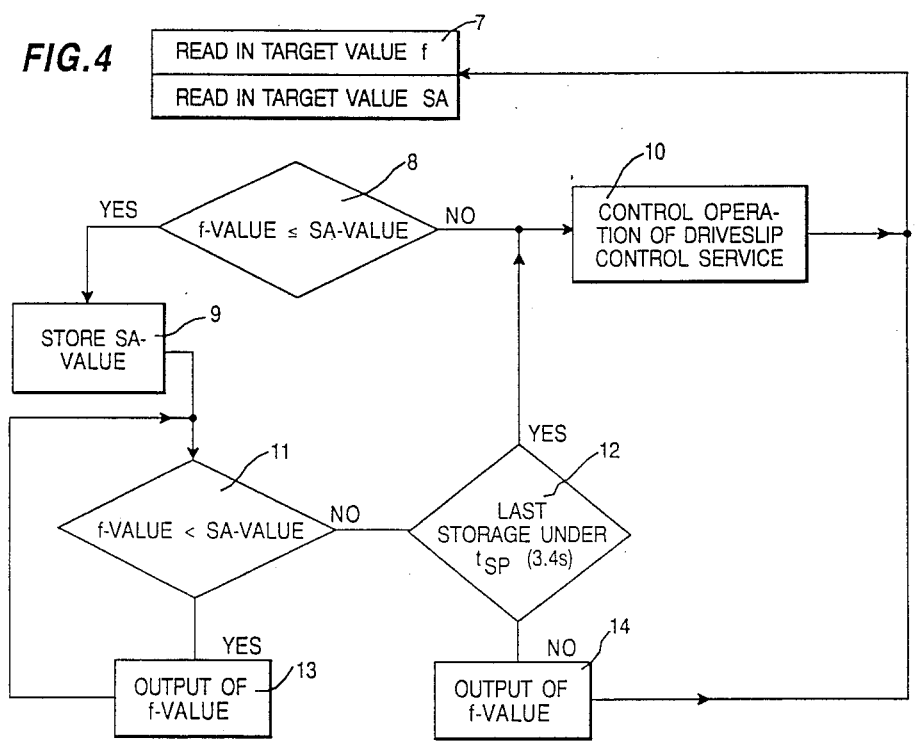

DRIVE-SLIP CONTROL DEVICE FOR MOTOR VEHICLES

BACKGROUND AND SUMMARY OF THE INVENTION

The invention relates to a drive-slip control device for motor vehicles in which, when a driven vehicle wheel spins, this wheel is braked and when both driven wheels spin, engine power is also reduced. Spinning of the drive wheels is recognized by means of rotational-speed sensors and an electronic system and, when a spin signal is present on account of a differential-speed threshold value between driven and non-driven vehicle axle being exceeded, the power of the engine is reduced in a controlled manner by the electronic system during the duration of the spin signal by means of a final control element. When the spin signal ceases, the power of the engine is increased again in a controlled manner to a target value predetermined by the driver by means of the accelerator.

A drive-slip control device of this general nature can be found (German OffenLegungsschrift 3,544,294) the object of which is generally to prevent uncontrolled spinning of the drive wheels when a vehicle is being started on a smooth base.

The spinning of the wheels is sensed by wheel rotational-speed sensors and is evaluated in the electronic system. If only one wheel spins, the associated wheel brake is actuated (differential brake) via a brake control valve. A drive moment is thereby transmitted via the wheel differential to the other non-slipping wheel.

If both drive wheels spin, however, the power of the driving engine is reduced in a controlled manner. To this end, the throttle linkage is operated to reduce the value set by the driver.

The engine control by the drive-slip control device thus normally comes into effect when there is a certain differential speed between the driven and non-driven vehicle axles. If the speed again drops below this speed differential threshold, the engine over-ride control is switched off and the power of the engine is again increased in a controlled manner to the value predetermined by the driver via the accelerator pedal.

During gear-shift operations in particular, when the engine control by the drive-slip control device works before gear disengagement, it is found that after the reengagement and acceleration, the known engine control function of the drive-slip control device is not always able to absorb the excess power occurring. Correspondingly, high slip amplitudes can occur and thus lead to instability of the vehicle. This applies equally when power is reduced by easing back on the accelerator and when the throttle is again opened immediately afterwards and without a gear-shift operation. This corresponds, to a shock reaction or a speed adaption.

The object of the invention is to design a drive-slip control device of the above general nature in such a way that the travelling stability of the vehicle is also ensured during gear shift operations as mentioned above.

This object is achieved when the predetermined driver accelerator target value falls back during an engine control operation of the drive-slip control device to or below the instantaneous control target value reached at an instant during the control operation because of a gear shift. This instantaneous control target value reached at that instant is recorded and is used for the final controlling control element. The instantaneous control target value also corresponds to the instantaneous accelerator target value at that instant. The recorded instantaneous control target value is stored for a predetermined time. After the power falls back during reacceleration after the gear shift, the control operation to increase power (by the presetting of a new accelerator target value) follows the accelerator target value only when the stored instantaneous control target value is reached after a predetermined time period, whereas it follows the engine-control target value trend when the stored instantaneous control target value is reached within the predetermined time period.

The invention here starts from the consideration that the transmittable power, e.g. before and after a gearshift operation is about the same, when the condition of the roadway remains stable, so that the value for maximum power after a gear-shift operation should be that value which was present before the gear-shift operation after an engine control operation of the drive-slip control device.

Other objects, advantages and novel features of the present invention will become apparent from the following detailed description of the invention when considered in conjunction with the accompanying drawings.

BRIEF DESCRIPTION OF THE DRAWINGS

FIG. 3 shows a diagram explaining the invention,
and
FIG. 4 shows a sequence diagram.

DETAILED DESCRIPTION OF THE DRAWINGS

Figure 1:
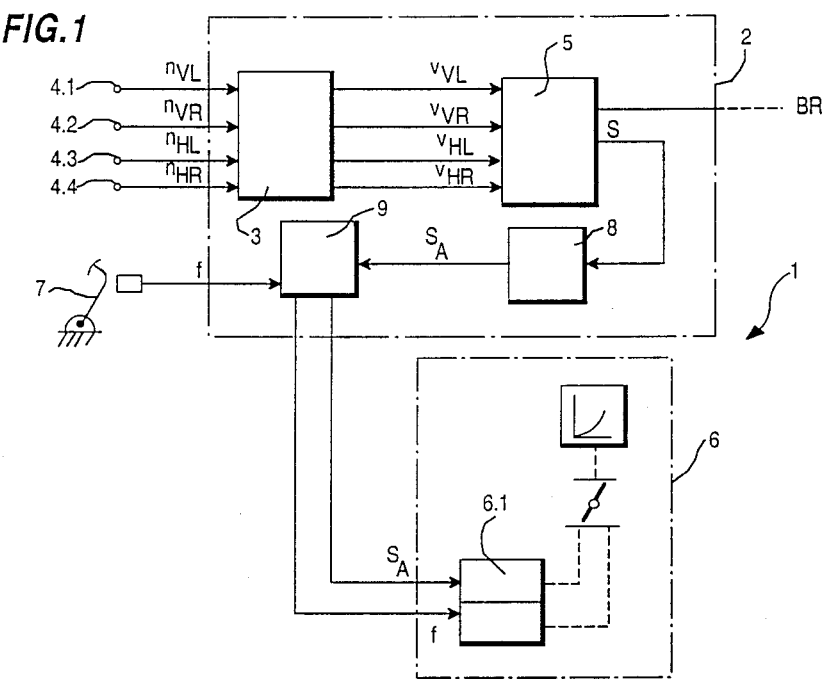
FIG. 1 shows a schematic block diagram of the drive-slip control device.
Figure 2:
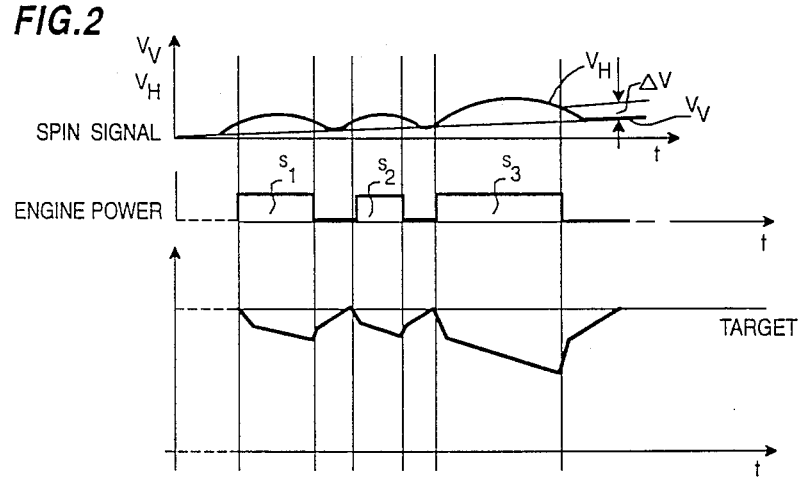
FIG. 2 shows vehicle characteristic diagrams.

According to the FIG. 1, wheel rotational-speed signals $n_{VL}$ and $n_{VR}$ from the non-driven wheels and $n_{HL}$ and $n_{HR}$ from the driven wheels are fed by rotational-speed sensors 4.1 to 4.4 to a signal processing stage 3 of the electronic control system 2 of the drive-slip control device 1 and are converted by signal processing stage 3 into wheel speed signals $v_{VL}$, $v_{VR}$, $v_{HL}$, and $v_{HR}$ which in turn are fed to a comparator circuit 5. The comparator circuit is utilized to determine whether both drive wheels are slipping, as well as average speeds $v_v$ and $v_H$ of the non-driven and driven axle, which are compared to one another. It is possible to treat $v_v$ as equivalent to vehicle travelling speed. If $v_H$ relative to $v_v$, now exceeds a predetermined target value $\Delta v$ (for example 1.8 km/h) a spin signal S is produced which is fed to a module 8 of the drive-slip control device which generates a corresponding engine-control target value $S_A$ and applies it via a memory device 9 to a final control element 6.1 of a throttle valve control system 6 (or fuel injection pump). This signal $S_A$ has priority over the driver accelerator target value signal f, Likewise fed via the memory 9, so that direct control of the engine by the driver is prevented. The signal $S_A$ now causes the engine power to be reduced in a controlled manner during the duration of the signal S. The duration of the signal S depends on when, on account of the called for reduction in power $S_A$, $v_H$ relative to $v_v$ again falls below the predetermined threshold target value $\Delta v$. If $v_H$ falls below this predetermined threshold value $\Delta v$, the signal S is eliminated and the power of the engine is again increased in a controlled manner to the accelerator target value f predetermined by the driver, unless the threshold value is again exceeded and a new spin signal S is generated. This operation can be repeated several times, as shown in FIG. 2 with reference to the signals $S_1$ to $S_3$.

Referring to FIG. 3, if a reduction in power is now made during an engine-control operation I of the drive-slip control device (for example a gear shift takes place), the accelerator target value f, during the return movement of the driver accelerator 7, follows the broken line characteristic curve f of FIG. 3. At the instant t, the instantaneous accelerator target value corresponds to the instantaneous control target value reached during the control operation of the drive-slip control device of the engine-control target value (solid line $S_A$). This instantaneous control target value $S_{At}$ at the point of the overlap $f/S_A$ is now stored in the memory 9, for a predetermined time $t_{SP}$ (e.g. 3.4 seconds). During gear-shift operation II, the accelerator target value f falls back still further and, once the shift operation is complete, again rises during acceleration by being increased by the accelerator 7. If the accelerator target value f reaches the stored instantaneous control target value $S_{At}$ within the predetermined time $t_{SP}$, the further control operation III takes place according to the engine-control target value $S_A$. If, on the other hand, the instantaneous control target value $S_{At}$ is only reached after passage of the storage time $t_{SP}$, the further control operation to increase power takes place according to the accelerator target value f. Thus during the time period $t_{SP}$, the value $S_{At}$ controls and only after passage of the time period $t_{SP}$ can the then current setting of f control.

The sequence logic required for the memory 9 is shown in FIG. 4. Initially the values f and $S_A$ are read at out a box 7 and compared at box 8. If f is equal to or less than $S_A$, $S_A$ is stored at box 9. If f is greater than $S_A$, slip occurs and an engine control (throttle, fuel, ignition, etc.) is caused to happen by box 10 which will also feed back to control $S_A$ at box 7. At such time as value f becomes equal to or lower than $S_A$, the stored value of $S_A$ from the control at box 11 (box 9 is during the time period $t_{SP}$ at box 12) as long as f is less than the value stored at box 8 and this signal goes to box 11. If f is greater then that at box 13, this causes f to be the input to box 11 and it is then transmitted to box 12. Until the time period $t_{SP}$ passes, box 12 causes the stored $S_{At}$ signal to control and after passage of $t_{SP}$ allows f to control if f is fed to box 11, or else $S_A$ continues to control via box 14.

As is further apparent from FIG. 1, a signal for controlling the wheel brake BR is also produced by the comparator circuit 5 when slipping of a drive wheel on one side is recognized.

Although means of influencing the engine power by taking action on the throttle-valve control system is described in the exemplary embodiment, it is of course also possible to take action of way of controlling the engine ignition, or the fuel supply.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Drive-slip control apparatus for a motor vehicle having driven and non-driven wheels, and engine and an accelerator, comprising:

Sensor means for measuring separately rotational speed of each of said driven and non-driven wheels;

Spin signal generating means, responsive to output signals from said sensor means, for detecting a difference between the rotational speed of said driven and said non-driven wheels, and for generating a spin signal when said difference exceeds a predetermined threshold value;

Drive-Slip control means for generating an engine control target signal in response to said spin signal;

Engine control means for reducing and increasing power of said engine in a controlled manner in response to said engine control target signal;

Accelerator target control means for generating an accelerator target signal in response to a position of said accelerator pedal;

Memory means for detecting and storing, for a predetermined time interval, an instantaneous value of said engine control target signal, whenever said accelerator target signal equals or falls below said engine control target signal;

Said engine control means being adapted to cause speed of said engine to increase in response to said engine control target signal if said accelerator target signal thereafter increases to a value equal to or exceeding said stored instantaneous value of said engine control target signal within said predetermined time interval, and otherwise to cause the speed of said engine to increase in response to said accelerator target signal.

2. Apparatus according to claim 1, wherein said spin signal generating means is further adapted to detect a difference in the rotational speed as between one of said driven wheels and at least one other of said driven wheels, and to cause application of a breaking force to one of said driven wheels in response thereto.

* * * * *